Sept. 29, 1925.                    1,555,332
F. THORNTON, JR
RADIANT HEATER UNIT
Filed May 19, 1923
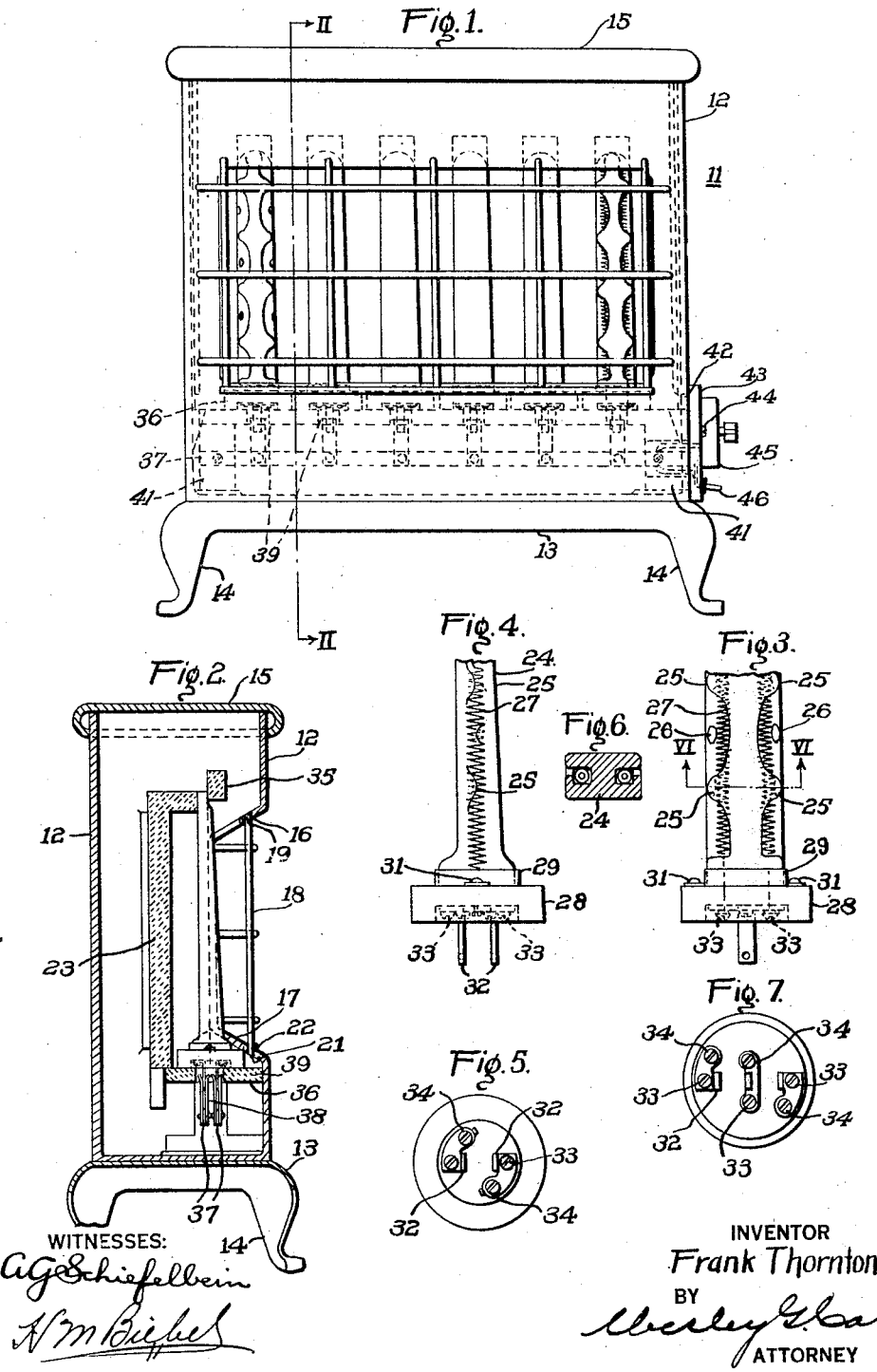
WITNESSES:
INVENTOR
Frank Thornton Jr.
BY
ATTORNEY Patented Sept. 29, 1925.

1,555,332

UNITED STATES PATENT OFFICE.

FRANK THORNTON, JR., OF PITTSBURGH, PENNSYLVANIA, ASSIGNOR TO WESTINGHOUSE ELECTRIC & MANUFACTURING COMPANY, A CORPORATION OF PENNSYLVANIA.

RADIANT HEATER UNIT.

Application filed May 19, 1923. Serial No. 640,065.

*To all whom it may concern:*

Be it known that I, FRANK THORNTON, Jr., a citizen of the United States, and a resident of Pittsburgh, in the county of Allegheny and State of Pennsylvania, have invented a new and useful Improvement in Radiant Heater Units, of which the following is a specification.

My invention relates to electrical heating devices and particularly to electric air heaters.

One object of my invention is to provide a relatively simple and compact heating unit that shall permit of being easily and quickly inserted in, and removed from, its operative position in a casing.

Another object of my invention is to provide a bus bar and terminal structure that shall co-operate with a plurality of radiant heating units to permit of their being easily and quickly inserted in, and removed from, their proper operative positions in a casing.

In practicing my invention, I provide a casing having a front opening therein and a plurality of spaced bus bars and resilient contact jaws located in said casing beneath said opening.

A plurality of vertically-extending, elongated, heating elements, each comprising a skeleton frame of refractory electric-insulating material, a resistor member supported thereby and a plurality of depending contact pins, are so supported in said casing back of said opening as to permit of the contact pins operatively engaging the contact jaws when the heating elements are placed in their proper operative positions in the casing.

In the single sheet of drawings,

Figure 1 is a view, in front elevation, of an electric air-heater comprising the device embodying my invention;

Fig. 2 is a view in vertical section therethrough, taken on the line II—II of Fig. 1;

Fig. 3 is a view, in front elevation, of a portion of a heating element embodying my invention;

Fig. 4 is a view in side elevation of a portion thereof;

Fig. 5 is a bottom plan view thereof;

Fig. 6 is a view in cross-section therethrough, taken on the line VI—VI of Fig. 3; and Fig. 7 is a bottom plan view of a modified form of terminal device.

An electric air heater 11 comprises a casing 12 that may be of any suitable or desired construction and is here illustrated as embodying a plurality or formed sheet-metal members or cast members to constitute a casing of pleasing and ornamental appearance. The casing 12 is mounted on a base 13 that is provided with a plurality of integral supporting members 14. The casing is further provided with a top member 15 that may be of any suitable or desired shape to harmonize with the general construction of the casing 12.

The front of the casing 12 is provided with a depressed portion 16 that has a front opening 17 therein. A protecting grating 18 comprises a plurality of horizontally and vertically-extending rods or wires that are suitably secured together. A plurality of spaced openings 19 is provided in the upper part of the depressed portions of the casing into which the upper ends of the vertically-extending wires may fit and a plurality of openings 21 is provided at the bottom part of the depressed portion 16, into which the bottom ends of the vertically extending wires may fit, to hold the grating 18 in its proper operative position in front of the opening 17. A horizontally-extending rod 22 is provided to limit the downward movement of the grating and maintain it in substantially the position illustrated in Figs. 1 and 2 of the drawing.

A reflector plate 23, of a suitable refractory material, is located within the casing 12 back of the front opening 17 and is supported in any suitable or desired manner within the casing.

A plurality of vertically-extending, elongated, heating elements are located within the casing 12 in front of the reflector plate 23 and back of the front opening 17 and severally comprise an elongated skeleton frame 24, of substantially I-shape in lateral section. A plurality of pairs of integral lugs 25 are provided on the front flange and extend backwardly from the rear surface thereof. A plurality of pairs of integral lugs 26 are provided on the front surface of the rear flange and project forwardly therefrom and are located intermediate the adjacent lugs 25, substantially as illustrated in Figs. 3 and 4 of the drawing.

A helically-wound resistor member 27 is located in the space between the two flanges of the member 24 and inside of the spaced and oppositely extending lugs 25 and 26, being maintained in its proper operative position by these lugs. The resistor member 27 extends along both sides of the central web of the member 24 and has its ends extending through suitable openings in the bottom portion thereof.

A base portion 28 of refractory material, is provided for each of the skeleton frames 24 and has mounted on its upper surface an annular metal member 29, that is secured thereto by suitable screws 31 and is of such internal diameter as to receive and hold the bottom portion of the member 24. I have illustrated the member 29 as being substantially circular in contour but this is not essential, as it may be made of any desired contour to conform to the contour of the bottom portion of the member 24. A plurality of terminal pins 32 are provided on the bottom surface of the member 28 and may be secured thereagainst by any suitable means, here shown as small machine screws 33. The ends of the resistor wire 27 are secured against integral portions of the terminal pins 32 by machine screws 34.

The skeleton frames 24 and the resistor members 27, respectively associated therewith, are mounted either in spaced relation or in closely adjacent relation relatively to each other in the casing and may have their upper ends held against an integral part of the reflector plate 23 by a bar 35, of a suitable refractory material, that is located in the upper part of the casing 12. The heating elements comprising the skeleton frames 24, resistor members 27, the base portions 28 and the terminal pins 32 may be supported in their proper operative positions in the casing 12 on a plate or bar 36 of a suitable refractory electric-insulating material that is supported in any suitable or desired manner, either in the casing 12 or in a bus bar and control-switch structure to be hereinafter described in detail.

A plurality of bus bars 37 are located in spaced relation relatively to each other in the bottom portion of the casing 12 and have mounted thereon a plurality of resilient contact jaws 38 that are located in spaced relation thereon substantially in line with and beneath the respective heating elements hereinbefore described. A plurality of spaced openings 39 are provided in the plate 36 to permit of the contact terminal bars 32 extending through the plate 36 and operatively engaging the resilient contact jaws 38 when the heating elements are placed in their proper operative positions on the plate 36 in the casing.

A plurality of refractory electric-insulating blocks 41 may be provided, to which the respective ends of the bus bars 37 may be connected, the distance between the blocks 41 being sufficient to permit of their fitting closely within the casing 12 substantially as illustrated in Fig. 1 of the drawing. An opening 42 is provided in one side of the casing 12, through which the bus-bars 37, the blocks 41 and the contact jaws 38 may be inserted and this opening is sufficiently high to permit of securing the plate 36 against the top surfaces of the blocks 41, if desired, whereby a substantial bus bar and heating-element supporting structure is obtained. A plate 43 is provided to cover the opening 42 and it may be secured against the side of the casing by screws 44. A snap switch 45 may be mounted on the outer face of the plate 43 and be suitably connected to the bus bars 37 and a plurality of terminal members 46, also mounted on the plate 43, to permit of energizing the heating elements.

I have illustrated a modification of a terminal construction in Fig. 7, of the drawing, in which three terminal pins or bars are shown as being located on the bottom surface of the base members 28. By providing three bus bars and contact jaws thereon, I am able to alternately connect adjacent heating elements to the respective bus bars so that, by the provision of a suitable three-heat snap switch, I provide a three-heat control in a manner well known in the art.

The device embodying my invention thus provides a radiant heating element that may be easily and quickly inserted in its proper operative position within the open front casing after the protecting grating 18 has been removed therefrom, by first inserting the upper end of the refractory frame 24 and then dropping the assembled heating element to substantially the position illustrated in Fig. 2 of the drawing, whereby it is placed in its proper operative position and, at the same time, is caused to operatively engage the resistor contact jaws cooperating with the terminal pins 32. In case of failure of any one of the resistor members 37, the heating element may be easily and quickly removed and a new one substituted therefor, the entire operation requiring but a relatively short period of time.

Various modifications may be made in my invention without departing from the spirit and scope thereof, and I desire, therefore, to be limited only by the scope of the appended claims.

I claim as my invention:

1. In an electric heater, in combination, a casing, and a plurality of quickly removable, radiant heating elements in said casing, each heating element comprising a vertically-extending, elongated, skeleton frame of refractory material, a base portion, contact terminals mounted on said base portion and a resistor member extending longitudinally of said skeleton frame.

2. In an electric heater, in combination, a casing having a front opening therein, a plurality of sets of contact jaws mounted in said casing, and a plurality of quickly removable, radiant, heating elements in said casing, each heating element comprising a vertically-extending, elongated, skeleton frame of refractory material, an end portion, a resistor extending longitudinally of said skeleton frame, and contact terminals on said end portion normally operatively engaging said contact jaws.

3. In an electric heater, in combination, a casing having a front opening therein, a refractory electric-insulating bus-bar and heating element supporting structure in said casing, a plurality of bus bars and of contact jaws supported by said structures, and a plurality of vertically-extending, elongated, radiant heating elements each comprising a skeleton frame, a base portion therefor, a resistor member on said frame, and depending contact terminals on said base portion, said contact terminals operatively engaging said contact jaws when said heating elements are placed in proper operative positions on said supporting structure.

4. In an electric heater, in combination, a casing having a front opening therein, a bus-bar and heating-elements supporting structure in said casing below said front opening, a plurality of bus-bars and contact jaws supported by said structure and a plurality of radiant heating elements in said casing back of said front opening and having contact terminals normally operatively engaging said contact jaws, supported by said structure and removable therefrom by a substantially vertical movement relatively thereto.

5. In an electric heater, in combination, a casing, a plurality of bus bars and of contact jaws in said casing, a plurality of radiant heating elements in said casing, a control switch located on the outside of said casing, and a single means for operatively supporting said bus bars, contact jaws, heating elements and switch in proper operative positions relatively to each other and to said casing.

6. In an electric heater, in combination, a casing, a plurality of bus bars and of contact jaws in said casing, a plurality of radiant heating elements in said casing, a control switch located on the outside of said casing, and a single means for operatively supporting said bus bars, contact jaws, heating elements and switch in proper operative positions relatively to each other and to said casing, said supporting means, bus bars, contact jaws, and switch being removable as a unit from said casing.

In testimony whereof, I have hereunto subscribed my name this 15th day of May, 1923.

FRANK THORNTON, Jr.